United States Patent
Beilin et al.

(10) Patent No.: US 7,864,106 B2
(45) Date of Patent: Jan. 4, 2011

(54) PULSE DOPPLER COHERENT RADAR OR ULTRASOUND DETECTION METHOD AND SYSTEM FOR SNR ENHANCEMENT

(75) Inventors: Ella Beilin, Ashdod (IL); Jehezkel Grizim, Givat-Shmuel (IL); Yacov Vagman, Rishon LeZion (IL); Alexander Lomes, Maccabim (IL)

(73) Assignee: Elta Systems Ltd., Ashdod (IL)

( * ) Notice: Subject to any disclaimer, the term of this patent is extended or adjusted under 35 U.S.C. 154(b) by 8 days.

(21) Appl. No.: 12/081,605

(22) Filed: Apr. 17, 2008

(65) Prior Publication Data

US 2009/0046001 A1  Feb. 19, 2009

Related U.S. Application Data

(63) Continuation of application No. PCT/IL2006/001161, filed on Oct. 5, 2006.

(30) Foreign Application Priority Data

Oct. 19, 2005 (IL) ........................ 171464
May 7, 2006 (IL) ........................ 175465

(51) Int. Cl.
*G01S 13/12* (2006.01)
*G01S 13/22* (2006.01)
*G01S 13/00* (2006.01)

(52) U.S. Cl. ................. 342/137; 342/27; 342/28; 342/89; 342/104; 342/115; 342/118; 342/134; 342/135; 342/159; 342/160; 342/162; 342/163; 342/175; 342/195; 342/196

(58) Field of Classification Search .............. 342/21, 342/22, 27, 28, 82–115, 118, 128–145, 159–164, 342/175, 192–197, 25 R–25 F; 367/7–11, 367/87–114, 117; 600/407, 425–430, 437–461; 702/1, 57, 79
See application file for complete search history.

(56) References Cited

U.S. PATENT DOCUMENTS 3,828,348 A * 8/1974 Murray, Jr. .................. 342/94
4,214,242 A * 7/1980 Colin .......................... 342/137
4,622,552 A * 11/1986 Andrews et al. ............ 342/196

(Continued)

FOREIGN PATENT DOCUMENTS

FR    2736161 A1    1/1997

OTHER PUBLICATIONS

Austrian Patent Office, "Austrian Search Report for SG Application No. 200803003-3," mailed Feb. 15, 2010, pp. 1-6.

*Primary Examiner*—Bernarr E Gregory
(74) *Attorney, Agent, or Firm*—Oliff & Berridge, PLC (57) ABSTRACT

A method and system for SNR enhancement in pulse-Doppler coherent target detection for applications in the fields of radar and ultrasound. In accordance with the method of the invention, complex signals are obtained for each of two or more sub-intervals of the time-on-target interval, allowing simultaneous range and Doppler measurements. A coherent integration is the performed on the signals to generate complex-valued folded matrices. The folded matrices are unfolded and target detection is then performed in a process involving one or more of the unfolded matrices. A pulse-Doppler coherent system is also provided configured for target detection by the method of the invention.

24 Claims, 4 Drawing Sheets

U.S. PATENT DOCUMENTS

| | | | |
|---|---|---|---|
| 4,709,236 A * | 11/1987 | Taylor, Jr. | 342/101 |
| 4,714,927 A | 12/1987 | Siegel et al. | |
| 4,839,655 A * | 6/1989 | Kiuchi | 342/93 |
| 4,916,452 A * | 4/1990 | Borchert et al. | 342/109 |
| 4,931,800 A * | 6/1990 | Ward | 342/162 |
| 4,973,968 A * | 11/1990 | Hurd | 342/137 |
| 5,248,976 A * | 9/1993 | Niho et al. | 342/25 A |
| 5,311,189 A * | 5/1994 | Nagel | 342/95 |
| 5,457,462 A | 10/1995 | Mitsumoto et al. | |
| 5,627,545 A | 5/1997 | Van Genderen et al. | |
| 5,760,734 A * | 6/1998 | Urkowitz | 342/159 |
| 5,818,371 A * | 10/1998 | Lu et al. | 342/192 |
| 6,018,311 A * | 1/2000 | David | 342/196 |
| 6,538,599 B1 * | 3/2003 | David | 342/196 |
| 6,539,320 B1 * | 3/2003 | Szajnowski et al. | 702/79 |
| 6,765,526 B1 * | 7/2004 | Doerry | 342/160 |
| 7,064,704 B2 * | 6/2006 | Bergkvist | 342/160 |
| 2004/0150552 A1 | 8/2004 | Barbella et al. | |

* cited by examiner

PULSE DOPPLER COHERENT RADAR OR ULTRASOUND DETECTION METHOD AND SYSTEM FOR SNR ENHANCEMENT

FIELD OF THE INVENTION

The present invention relates to methods and systems for SNR enhancement in a pulse Doppler coherent system.

BACKGROUND OF THE INVENTION

The pulse Doppler technique is common to most modern surveillance and tracking radars, and ultrasound systems. This technique employs a sequence of transmitted pulses which impinge on a target, are reflected from the target and are collected back in the receiver. This technique is particularly convenient when the velocity of the target is significantly different from the velocity of the background scatterers such as the ground, trees, foliage and so on. Under this condition, the detection capability of the system is maximized in terms of the signal to noise ratio (SNR) so that the probability of detection is improved.

Most modern surveillance radars scan the surrounding space using a relatively narrow radiation beam. The total scan time is usually the user specified parameter of the system. The fraction of scan time, allocated to collect target return from each beam direction, is called time-on-target. During this fraction of time a sequence of pulses is transmitted by the radar. The interval between the rise of any two consecutive pulses is called the PRI (Pulse Repetition Interval) and the rate of the pulses is called PRF (Pulse Repetition Frequency). Detection and measurement processes can be realized by using constant or variable PRF during the time-on-target interval. The maximum SNR can be achieved by coherent integration of all target returns during the entire time-on-target interval. Prima facie, the most tempting scheme for realization of such concept would appear to be to use a single constant pulse repetition frequency (PRF) for transmitting pulse sequence and utilization of target returns. However this scheme does not support unambiguous measurement of range or velocity or both.

Another problem related to a single PRF scheme of detection is the problem of blind zones (blind ranges and Doppler frequencies) in the detection map. This problem reflects the periodic nature of transmitting and receiving in pulse radar detection scheme and is known as the visibility problem.

One solution, known in the prior art, to both the ambiguity and the visibility problems is to transmit two or more pulse sequences consecutively, each sequence having a different PRF. Each sub-interval with constant PRF provides a different "scale" of ambiguous but simultaneous measurement of the target range and Doppler frequency. The combination of all measurements (each with a different PRF) during time-on-target interval allows ambiguity resolution, but requires independent attempts of detection. In other words, the requirement to provide simultaneous detection and measurement of the target leads to partitioning of the time-on-target interval to several independent sub-intervals, each of which represents a relatively small part of the entire time-on-target interval. The detection process in each sub-interval, known also as "Coherent Processing Interval" and for short CPI, can be performed optimally by using coherent integration, but the maximum energy collected from the target return is only a fraction of the entire energy that could be collected during the entire time-on-target interval. Any logical or arithmetical combination of the results of sub-interval leads to losses and degradation in probability of detection in comparison with coherent integration of the signal during entire time-on-target interval.

Figure 1:
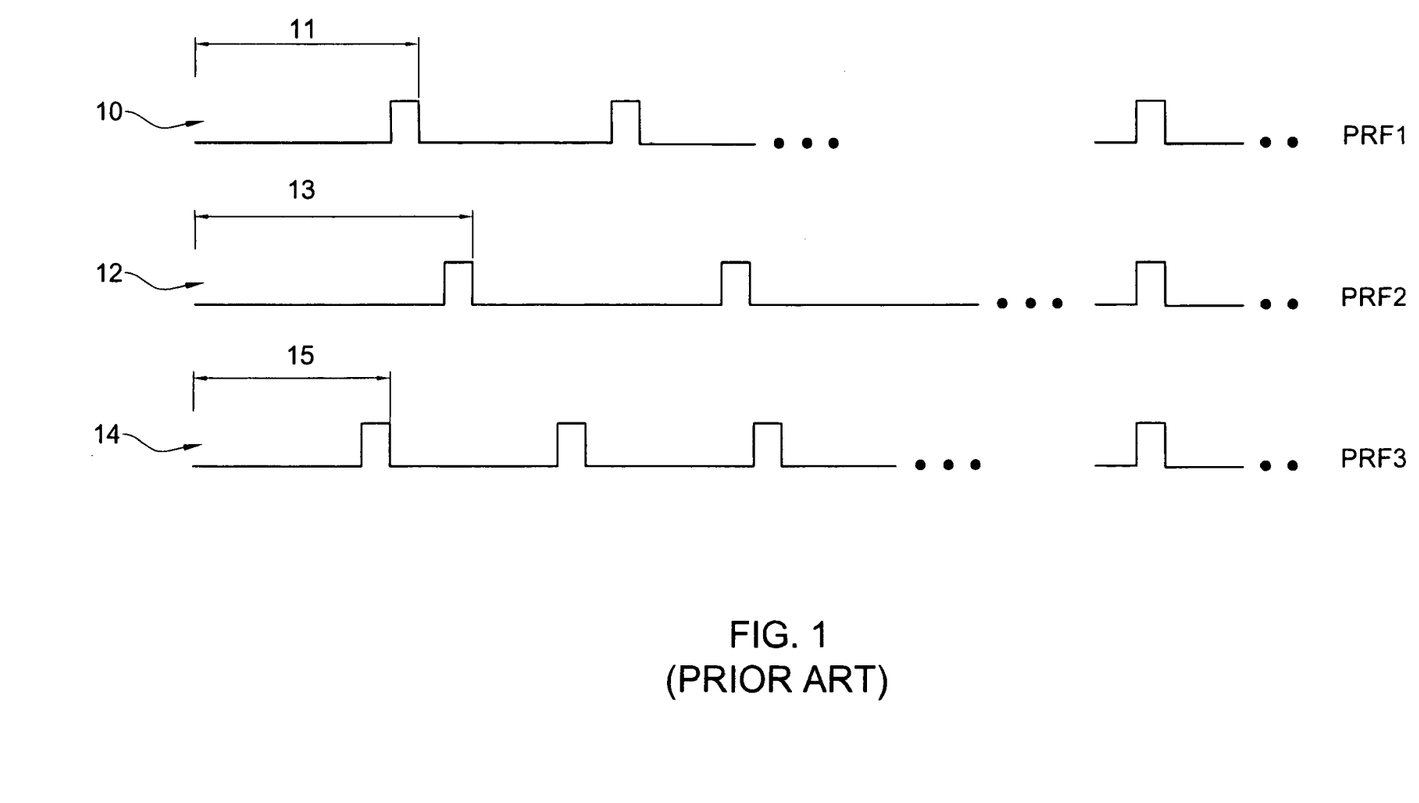
FIG. 1 shows a prior art method for resolution of ambiguity of target detection.

The concept of ambiguity resolution in range is presented in FIG. 1, showing the signals received when three pulse sequences shown respectively as PRF1, PRF2 and PRF3 are transmitted, each having a different PRF. The returned signals consist of a first pulse sequence 10 having a first PRI 11, a second pulse sequence 12 having a second PRI 13, and a third pulse sequence 14 having a third PRI 15. By using several frequencies, the unambiguous range can be solved. This is depicted in FIG. 1, where the unambiguous range 16 is detected at a position where pulses in the three pulse sequences coincide. Generally, the unambiguous range and Doppler of the target can be imagined as "coordinates" of the target detection hit of the unfolded range-Doppler map, which covers full range of the radar specified detection ranges and velocities (Doppler frequencies). This map is not explicitly represented in firmware or software of the radar, but one can think of it as sets of target hit coordinates, each for every detected target.

The narrow band signal that is collected in the receiver is usually modeled as $s(t)=A(t)\cos(2\pi f_c t+\Phi(t))+N(t)$, where t is time, A is the amplitude, $f_c$ is the carrier frequency, $\Phi$ is the phase, and N is the noise. A basic assumption in this model is that the bandwidth of the amplitude A is orders of magnitude smaller than $f_c$. The signal is processed along the receiving channel. It is frequency down-converted, filtered, split into two channels called the in-phase and quadrature, de-modulated (or pulse compressed) and digitized—not necessarily in that order. It is customary to represent the result obtained at this stage of the processing of a single PRF as a complex value entity: $x_k^l = x^l(t_k) = B^l e^{j(\Phi_0^l + 2\pi f_d t_k)} + n^l(t_k)$, where l is the index of the PRF and is related to the time interval of the measurement, $t_k$ is the time of the specific sample, known as the "range gate" number, $B^l$ is the amplitude which is constant within the period of the measurement, $\Phi_0^l$ is some phase constant within the period of the measurement, $f_d$ is the Doppler frequency, and $n^l$ is the complex noise.

Figure 2:
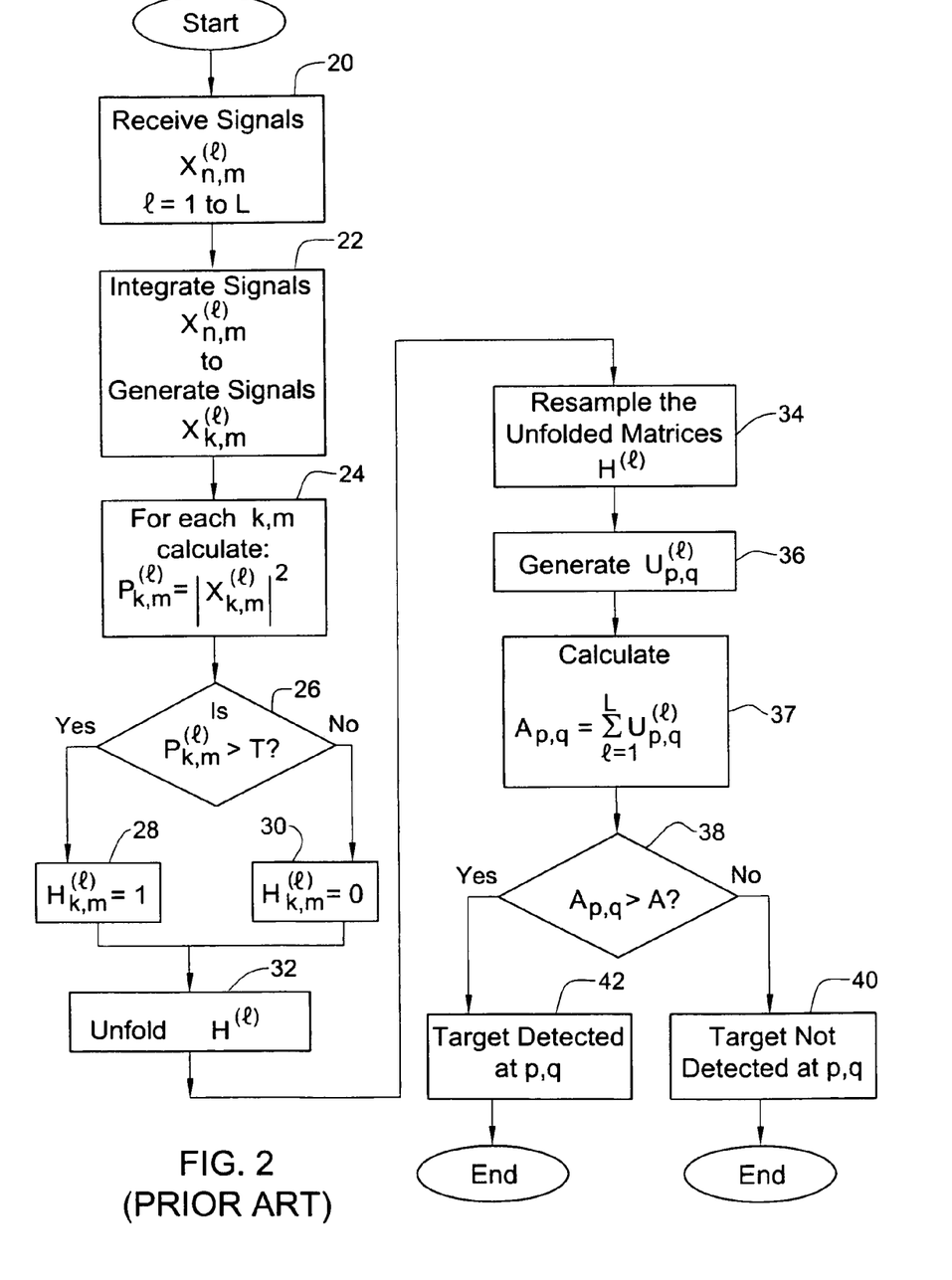
FIG. 2 shows a prior art method for target detection in a pulse-Doppler coherent system.

FIG. 2 shows a prior art method for target detection in a pulse-Doppler coherent system using L different PRFs. As denoted by 20, a signal $x_{nm}^{(l)} = x^{(l)}(t_{nm})$ is received for each PRF used, where l=0 to L−1 is the PRF index, n is the pulse number in the signal, m is the range gate, and $t_{n,m}$ is the sampling time of the signal of the range gate m of the pulse n, and is given by $t_{n,m}^{(l)} = n PRI^{(l)} + m RG$, where PRI is the pulse rate interval and RG is the duration of a single range gate. At 22, the signals $X_{nm}^{(l)}$ are subjected to coherent integration. This involves performing a discrete Fourier transform on the signals $x_{nm}^{(l)}$ to generate a signal spectrum for each range gate m. The combination of all spectra for all range gates, obtained for each CPI, composes the folded range-Doppler map given by:

$$X_{km}^{(l)} = \sum_{n=0}^{N^{(l)}-1} x_{nm}^{(l)} w_n e^{-\frac{2\pi jkn}{K}},$$

$$k = 1, \ldots, K, l = 1, \ldots, L, m = 1, \ldots, M^{(l)}$$

where $N^{(l)}$ is the number of pulses in the signal, k is an index of the Doppler frequency, K is the number of Doppler frequencies, $w_n$ is a weighting factor, and $M^{(l)}$ is the number of range gates of the PRF 1. At 24, real-valued range-Doppler maps are generated for each PRF l, a real-valued K by $M^{(l)}$ matrix $P^{(l)}$ is defined by setting, $P_{km}^{(l)}=|X_{km}^{(l)}|^2$ for each pair of indices k and m, and at 26, the target detection is performed, whereby it is determined whether the value $P_{km}^{(l)}$ is greater than or equal to a predetermined threshold T. If so, then at 28, $H_{km}^{(l)}$ is set to 1. If not, then at 30, $H_{k,m}^{(l)}$ is set to 0. This defines a $K\times M^{(l)}$ binary matrix $H^{(l)}$ for each value of l. This process is repeated for each CPI independently, producing the sets of target hits for each CPI, which are determined by their range—Doppler cell addresses—each PRF defines its own (generally folded) scale of cell addressing. Thereafter, the algorithm obviously need not record the matrices, but rather the sets of target hits and their cell coordinates. At 32, the hit sets for each PRF are unfolded by periodically increasing the cell addresses in range direction by a step of ambiguous range up to the maximum instrumental range and in Doppler direction by step of PRF up to the maximum Doppler frequency (the unfolded target hits for each PRF can be interpreted as non-zero values of some sparse matrices composed from zeros and ones)—the matrices $H^l$ are subjected to a process known as "unfolding". In this process, the dimensions of each matrix $H^l$ are increased by defining $H_{k',m'}^{(l)}$ for values of m' for which Rmin<m'·RG<Rmax where [$R_{min}$, $R_{max}$] is a predetermined detection region of interest, and for values of k' for which Dmin<k'·PRF/K<Dmax, Where [Dmin,Dmax] is a predetermined region of Doppler frequencies of interest, by setting $H_{k'm'}^{(l)}=H_{km}^{(l)}$, where k=k' mod K, and m=m' mod M. In step 34, the matrices $H^l$ are resampled by defining, for each pair of indices k, m, new indices p and q, as follows. The range of interest is divided into subintervals of a predetermined length Δr. A value of p is found from among all allowed values of p (i.e. integral values of p for which $0 \leq p\Delta r \leq R_{max}-R_{min}$) such that $R_p=R_{min}+p\cdot\Delta r$ is closest to the range represented by the range gate m. The interval [$D_{min}$, $D_{max}$] is divided into subintervals of a predetermined length Δd. A value of q is found from among all allowed values of q (i.e. integral values of q for which $0\leq q\Delta d\leq D_{max}-D_{min}$) such that $D_q=D_{min}+q\cdot\Delta d$ is closest to k. This generates at 36 new binary matrices $U^l$ where $U_{p,q}^{l}=H_{k,m}^{l}$, wherein the indices p,q correspond to the indices k,m. The sum A of the unfolded matrices is then calculated at 37, where $$A_{p,q}=\sum_{l=0}^{L-1}U_{p,q}^l.$$

At 38, it is determined, for each pair of indices, whether the sum $A_{p,q}$ is greater than or equal to a predetermined threshold A. If so, then at 40 a target is detected at the location having the associated indices p,q, and the process terminates. If not, then at 42 it is determined that a target is not detected at the location having the associated indices p,q, and the process terminates.

To summarize, the following observations are made:

1. Although target coherency is maintained for all of the pulses transmitted within the time-on-target interval, in known methods, only the signal received within a single CPI is integrated coherently.

2. The effectiveness of the integration depends on the coherence of the signal. The notion of coherence means that the relative phases are constant within the period of the measurement (up to some relatively small noisy contribution) or they vary in a predictable manner. Normally this requirement implies that the radar contributes a phase and amplitude that are essentially constant, at least within the time of measurement, and that the contribution of the target to phase variation is mainly due to its motion. The greater the signal-to-noise ratio of a target, the greater is its maximal detection range. Thus, increasing the coherent integration interval to the whole period when a target is illuminated by the antenna (time-on-target interval), the maximum possible signal-to-noise ratio is obtained, and, as a result, the maximum detection range.

Although theoretically two PRFs are sufficient to resolve ambiguity, the required number of PRFs is actually higher. This is due to the fact that some range gates are blind in each PRF. In the simplified representation of FIG. 1, these are the ranges, corresponding to the time during which the system is transmitting and cannot receive. This was referred to above as the problem of visibility. The number of PRFs used typically varies from 2 to 8 depending on the level of visibility that is required. However, the amount of time that can be allocated to the integration procedure of each PRF is reduced as the number of PRFs is increased. Since the signal-to-noise ratio is proportional to the coherent integration interval duration, as the number of PRFs is increased, the signal to noise ratio of each PRF decreases. This impairs the effectiveness of the conventional technique.

SUMMARY OF THE INVENTION

An object of the present invention is to maximize the results of integration procedure to the extent allowed solely by the coherence of the target.

In its first aspect, the present invention provides a method for target SNR enhancement in a pulse-Doppler coherent system, while allowing simultaneous measurements of the target kinematical parameters. The method may be used, for example, in surveillance and tracking radar or an ultrasound system. A sequence of transmitted pulses, reflected from targets and collected by the radar, is processed. In accordance with the invention, the processing includes a two-step coherent integration procedure. This is in contrast to the prior art methods in which a one-step coherent integration procedure is followed by a detection decision. The non-coherent combination, i.e. binary integration of the results of detection, for each CPI, as is done in the prior art methods, is avoided in the method of the present invention.

In one preferred embodiment of the invention, the received signals are subjected to a first coherent integration step by carrying out, for example, a discrete Fourier transform on the signals. This generates complex valued folded matrices (one for each PRF used). The folded matrices are unfolded and resampled. New matrices are then generated by complex value interpolation of the original matrices. To account for target motion, a Doppler phase correction is necessary for each of the interpolated matrices. Consecutive CPI-s have specific delays relative to the first one. These delays entail that each cell of the unfolded consecutive CPI-s be shifted by the phase which is determined by Doppler frequency of the cell and time delay of the CPI containing this cell. These phase shifts can be calculated and their effect can be compensated for each cell. The Doppler phase corrected matrices are then summed in a second coherent integration step. The resulting matrix is composed of the cells containing coherent sums of unfolded range-Doppler matrices received from different CPIs. It covers all radar specified ranges and Doppler frequencies. The resulting matrix is then converted into a real-valued matrix A, taking magnitudes of each cell. Detection is then performed in each cell of the matrix.

The decision regarding target detection is taken only after integration of the entire signal, collected during time-on-target interval, without any intermediate logical decisions.

In a second aspect, the present invention provides a pulse-Doppler coherent system configured for target detection by the method of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 3:
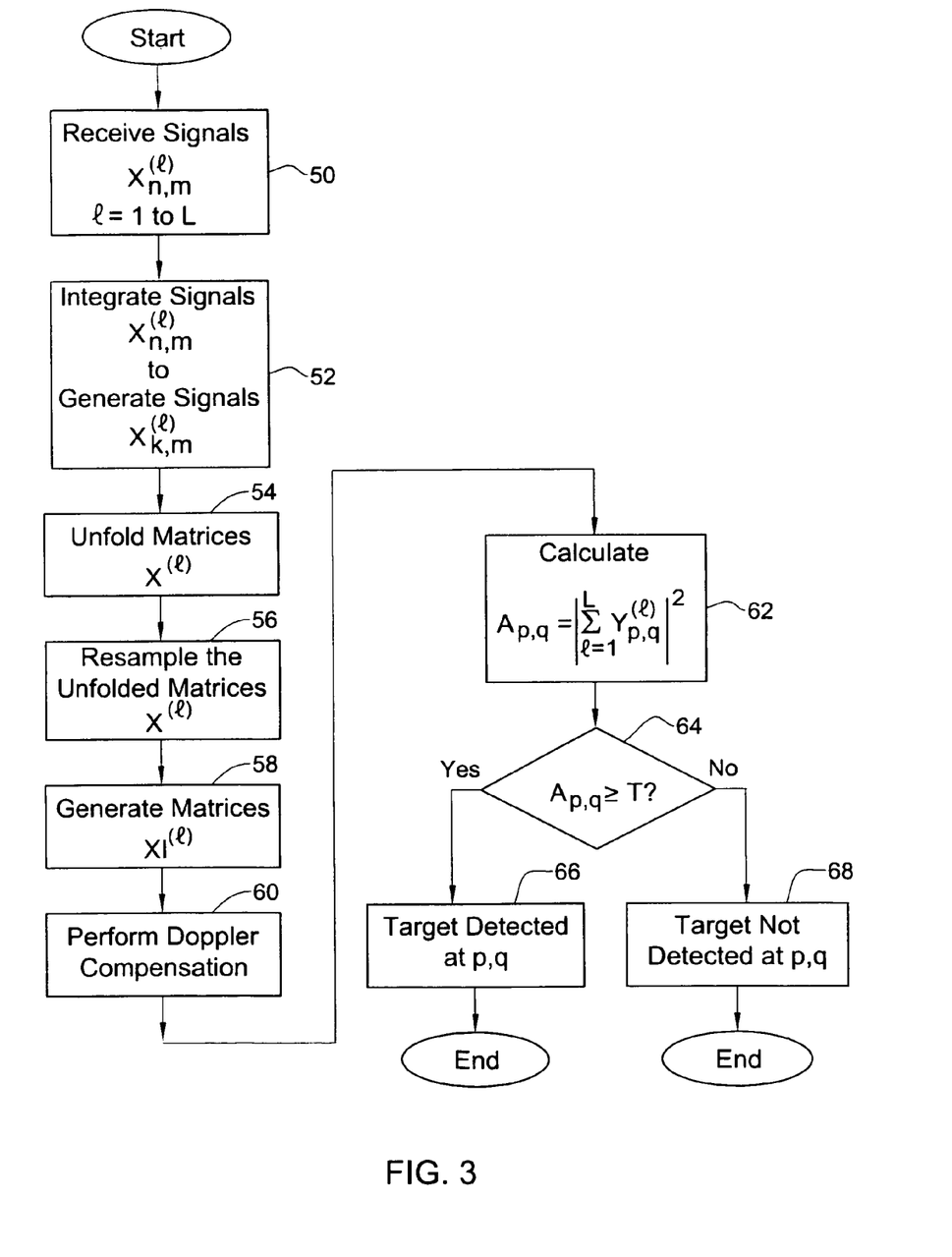
FIG. 3 shows a method for target detection in a pulse-Doppler coherent system in accordance with one embodiment of the invention.

FIG. 3 shows a method for target detection in a pulse-Doppler coherent system, in accordance with one embodiment of the invention. At 50, a signal $x_{nm}^{(l)}=x^{(l)}(t_{nm})$ is received for each PRF used, where $l=1$ to $L$ is the PRF index, $L$ is the number of PRFs used, $n$ is the pulse number in the signal, $m$ is the range gate, and $t_{nm}$ is the sampling time of the signal of the range gate $m$ of the pulse $n$, given by $t_{n,m}^{(l)}=nPRI^{(l)}+mRG+t_l$, where PRI is the pulse rate interval, RG is the duration of a single range gate and $t_i$ is the start time of the l-th CPI counted from some reference point—for example the beginning of the 1-st CPI. At 52, the signals $x_{nm}^{(l)}$ are subjected to coherent integration in which a discrete Fourier transform is performed on the signals $x_{nm}^{(l)}$ to generate a signal $$X_{km}^{(l)} = \sum_{n=0}^{N^{(l)}-1} x_{nm}^{(l)} w_n e^{-\frac{2\pi j k n}{K}},$$

$k=0,\ldots,K-1, l=0,\ldots,L-1, m=0,\ldots,M^{(l)}-1,$ where $k$ is an index of the Doppler frequency, $K$ is the number of Doppler frequencies, $N$ is the number of pulses in the signal, $w_n$ is a weighting factor and $M^{(l)}$ is the number of range gates of the PRF l. At 54, the complex matrices $X^l$ are unfolded by defining $X_{k',m'}^{(l)}$ for values of m' for which $R_{min} < m' \cdot R_G < R_{max}$, where $[R_{min}, R_{max}]$ is a predetermined detection region of interest, and for values of k' for which $D_{min} < k' \cdot PRF/K < D_{max}$, where $[D_{min}, D_{max}]$ is a predetermined region of Doppler frequencies of interest, by setting $X_{k'm'}^{(l)}=X_{km}^{(l)}$, where $k=k'$ mod K, and $m=m'$ mod M. At 56, the matrices $X^l$ are resampled by defining, for each pair of indices k'm', new indices p and q, as follows. The range of interest is divided into subintervals of a predetermined length $\Delta r$. A value of p is found from among all allowed values of p (i.e. integral values of p for which $0 \leq p\Delta r \leq R_{max}-R_{min}$) such that $R_p=R_{min}+p\cdot\Delta r$ is closest to the range represented by the range gate m. The interval $[D_{min}, D_{max}]$ is divided into subintervals of a predetermined length $\Delta d$. A value of q is found from among all allowed values of q (i.e. integral values of q for which $0 \leq q\Delta d \leq D_{max}-D_{min}$) such that $D_q=D_{min}+q\cdot\Delta d$ is closest to k. New matrices $XI^{(l)}$ are generated at 58 where $XI_{p,q}^{(l)}$ is obtained by complex value interpolation of one or more values of $X_{k',m'}^{(l)}$, for indices k'm' in a neighborhood of the indices p q. Any method of interpolation may be used in accordance with the invention. The interpolation may be linear interpolation or higher order interpolation. At 60, a Doppler phase correction is performed on each of the matrices $XI^{(l)}$ to yield matrices $Y^{(l)}$ defined by $Y_{p,q}^{(l)}=XI_{p,q}^{(l)}\cdot e^{-2\pi j\cdot D_q\cdot t_l}$.

A real-valued matrix A is then calculated at 62, where $$A_{p,q} = \left|\sum_{l=0}^{L-1} Y_{p,q}^{(l)}\right|^2.$$

Since the $Y_{p,q}^{(l)}$ are complex values, the calculation of A is a coherent integration step. At 64, it is determined, for each pair of indices, whether the sum $A_{p,q}$ is greater than or equal to a predetermined threshold T. If so, then at 66 a target is detected at the location having the associated indices p,q, and the process terminates. If not, then at 68 it is determined that a target is not detected at the location having the associated indices p,q, and the process terminates.

Figure 4:
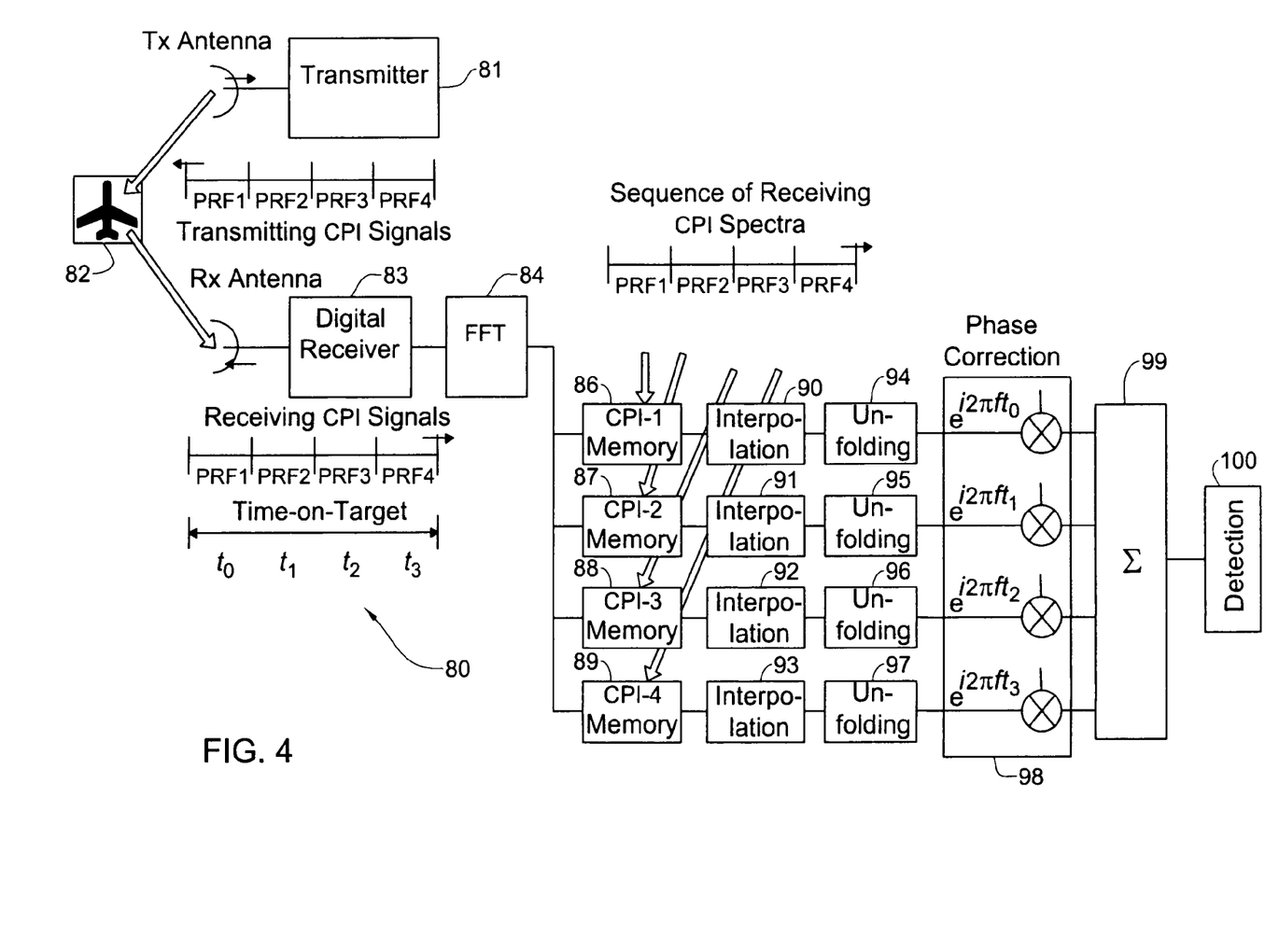
FIG. 4 is a block diagram showing functionality of a system that implements the method of the invention.

FIG. 4 is a block diagram showing functionality of a system 80 for implementing coherent integration of multiple CPI-s according to the method of the invention as described above with reference to FIG. 3. The system 80 includes a transmitter 81 having a Tx antenna for tracking an object 82 and a digital receiver 83 having an Rx antenna for receiving an echo signal reflected by the object. An FFT unit 84 is coupled to an output of the receiver 83, and a plurality of CPI memories 86-89 is coupled to an output of the FFT unit 84. A like plurality of interpolation units 90-93 is coupled to the CPI memories, and a like plurality of unfolding units 94-97 is coupled to respective outputs of the interpolation units. A phase correction unit 98 is coupled to the unfolding units, a summation unit 99 is coupled to an output of the phase correction unit and a detection decision unit 100 is coupled to an output of the phase correction unit.

The transmitter 81 generates and transmits via the Tx antenna sequences of signals characterized by their PRF values. An electromagnetic wave reaches the object 82 and its echo returns to the digital receiver 83 via its Rx antenna. Without loss of generality the Tx and Rx antennae can be implemented by the same physical device. The receiver 83 is matched to the transmitted signals and digitized samples are fed to the FFT unit 84, whose output is a sequence of CPI spectra for each PRF. The spectrum of each CPI is stored in a respective one of the memories 86-89 so that each memory stores the respective CPI spectra for a specific PRF. The received signals are shifted slightly from CPI to CPI with respect to the range-Doppler cells. It is to be noted that the terms 'grid', 'map' and 'cells' are equivalent and are used interchangeably through-out the specification. The interpolation units 90-93 serve to align the CPI signals with respect to the aforementioned cells. The results of the interpolation are unfolded by the unfolding units 94-97 by repeating the CPI-s range—Doppler maps up to the instrumented values of range and velocity. Each unfolded map is then phase-corrected by the phase correction unit 98 by multiplying the contents of each cell of the map by a respective complex exponent. The phase of each complex exponent is proportional to the product of the Doppler frequency and the time of the beginning of the appropriate CPI measured with respect to some reference time. Successful operation of the system 80 requires accurate estimation of these times. The phased corrected maps are fed to the summation unit 99 which generates a single map, which is fed to the detection unit 100. The detection unit 100 calculates the absolute value of each cell of the resulting map and compares the resulting absolute values to respective thresholds to provide target detection decision.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A pulse-Doppler coherent system comprising:
   a. a receiver configured to obtain signals corresponding to each of two or more coherent processing intervals (CPIs) within a time-on-target interval, wherein at least two CPIs are characterized by waveforms different in at least one parameter;
   b. a processing unit coupled to an output of the receiver and configured as following:
      i. to provide a coherent integration of said obtained signals, said integration resulting in complex signals corresponding to each of said two or more CPIs;
      ii. to provide interpolation of said complex signals in different CPIs thus giving rise to interpolated outputs;
      iii. to provide a coherent integration of the interpolated outputs or derivatives thereof corresponding to said two or more CPIs within the time-on-target integration; and
      iv. to provide a target detection decision in accordance with integration results.

2. The system of claim 1 wherein the processing unit is further configured to provide a phase correction of the interpolated outputs prior to the coherent integration thereof.

3. The system of claim 1 wherein the processing unit further comprises a storage unit configured to temporary store the complex signals corresponding to each of two or more CPIs within the time-on-target interval.

4. The system of claim 1 configured to allow simultaneous detection and measurements of target range and Doppler parameters.

5. The system of claim 1 being a radar system or an ultrasound system.

6. The system of claim 1 wherein said interpolation of complex signal is Doppler interpolation.

7. The system of claim 1 wherein said interpolation of complex signal is range interpolation.

8. A method of processing a signal received from a target and allowing simultaneous measurements of the target range and Doppler parameters, the method comprising coherent integration of the signal over the entire time-on-target interval consisting of two or more portions of time differing by at least one parameter of the wave form, the method further comprising:
   a. performing coherent integration of signal over each of said two or more portions of time, said portions serving as coherent processing intervals (CPIs), thus obtaining complex signals corresponding to each of said CPIs;
   b. performing coherent integration of the complex signals to generate two or more complex matrices corresponding to each of said CPIs;
   c. unfolding said matrices thus providing complex unfolded matrices; and
   d. performing target detection in a process involving one or more of said complex unfolded matrices.

9. The method of claim 8, wherein
   a. the parameter of the waveform differing the portions of time is pulse repetition frequency (PRF) characterizing respective CPI;
   b. the obtained complex signals are characterized as $x_{nm}^{(l)} = x^{(l)}(t_{nm})$, where $l=1$ to L is a PRF index, L is a number of PRFs used, n is a pulse number in the signal, m is a range gate, and $t_{n,m}$ is a sampling time of the signal of the range gate m of the pulse n;
   c. the complex matrices $X^l$ for $l=1$ to L are generated by performing coherent integration of the signals $x_{nm}^{(l)}$; and
   d. the complex unfolded matrices $X_{k'm'}^{(l)}$, are provided by unfolding the matrices X' for $l=0$ to $L-1$.

10. The method of claim 9, wherein performing coherent integration comprises calculating a discrete Fourier transform on one or more of the signals $x_{nm}^{(l)}$ to generate one or more signals $$X_{km}^{(l)} = \sum_{n=0}^{N^{(l)}-1} x_{nm}^{(l)} w_n e^{-\frac{2\pi j k n}{K}},$$

$$k = 1, \ldots, K, l = 1, \ldots, L, m = 1, \ldots, M^{(l)},$$

where k is an index of the Doppler frequency, K is the number of Doppler frequencies, N is the number of pulses in the signal, $w_n$ is a weighting factor and $M^{(l)}$ is the number of range gates of the PRF l.

11. The method of claim 9, wherein unfolding the matrices $X^l$ comprises:
   a. defining $X_{k',m'}^{(l)}$ for values of m' for which $R_{min} < mRG < R_{max}$, where $[R_{min}, R_{max}]$ is a predetermined detection region of interest, and for values of k' for which $D_{min} < k' \cdot PRF/K < D_{max}$, where $[D_{min}, D_{max}]$ is a predetermined region of Doppler frequencies of interest, by setting $X_{k'm'}^{(l)} = X_{km}^{(l)}$, where $k = k' \mod K$, and $m = m' \mod M$.

12. The method of claim 9, wherein unfolding the matrices $X^l$ comprises re-sampling the matrices $X^l$.

13. The method according to claim 12, wherein re-sampling the matrices $X^l$ comprises defining, for each pair of indices k'm', new indices p and q by:
   a. dividing the interval of interest $[R_{min}, R_{max}]$ into one or more subintervals of a predetermined length $\Delta r$;
   b. determining a value of p from among all values of p for which $0 \leq p' r \leq R_{max} - R_{min}$ such that $R_p = R_{min} + p \cdot \Delta r$ is closest to the range represented by the range gate m;
   c. dividing the interval $[D_{min}, D_{max}]$ into one or more subintervals of a predetermined length $\Delta q$; and
   d. determining a value of q from among all integral values of q for which $0 \leq q \Delta q \leq D_{max} - D_{min}$ such that $D_q = D_{min} + q \cdot \Delta q$ is closest to k.

14. The method according to claim 13, further comprising generating one or more matrices $XI^{(l)}$ where $XI_{p,q}^{(l)}$ is obtained by interpolation of one or more values of $X_{k',m'}^{(l)}$ for indices k'm' in a neighborhood of the indices p q.

15. The method according to claim 14, further comprising performing a Doppler compensation on one or more of the matrices $XI^{(l)}$.

16. The method according to claim 15, wherein performing the Doppler compensation includes calculating matrices $Y^{(l)}$ defined by $Y_{km}^{(l)} = XI_{km}^{(l)} \cdot e^{-2\pi j \cdot D_q \cdot t_0^{(l)}}$.

17. The method according to claim 16, wherein performing target detection comprises:
   a. calculating a real-valued matrix A where $$A_{p,q} = \left| \sum_{l=0}^{L-1} Y_{p,q}^l \right|^2 ; \text{ and}$$

b. determining, for each of one or more pairs of indices, whether the value of $A_{p,q}$ is greater than or equal to a predetermined threshold T, a target being detected at the location having the associated indices p,q if the value of $A_{p,q}$ is greater than or equal to T, and a target not being detected at the location having the associated indices p,q if the value of $A_{p,q}$ is not greater than or equal to T.

18. The method of claim 8 wherein the Doppler parameters are derived using a radar system or an ultrasound system.

19. A method of operating a pulse-Doppler coherent system, the method comprising:
   a. obtaining signals corresponding to each of two or more coherent processing intervals (CPIs) within a time-on-target interval, wherein at least two CPIs are characterized by waveforms different in at least one parameter;
   b. performing a coherent integration of said obtained signals, said integration resulting in complex signals corresponding to each of said two or more CPIs;
   c. interpolating the complex signals in different CPIs;
   d. performing a coherent integration of the interpolated outputs or derivatives thereof corresponding to said two or more CPIs within the time-on-target integration; and
   e. enabling to provide a target detection decision in accordance with the integration results.

20. The method of claim 19 wherein the interpolation of the complex signal comprises at least one action selected from the group including Doppler interpolation and range interpolation.

21. The method of claim 19 further comprising phase correction of the interpolated outputs prior to the coherent integration.

22. The method of claim 19 further comprising temporary storing the complex signals corresponding to each of two or more CPIs within the time-on-target interval prior to interpolating.

23. The method of claim 19 configured to allow simultaneous detection and measurements of target range and Doppler parameters.

24. A computer program product for operating a pulse-Doppler coherent radar system, the product comprising a computer readable physical medium having computer readable program code embodied therein, the product further comprising:
   a. computer readable program code for causing the computer to obtain signals corresponding to each of two or more coherent processing intervals (CPIs) within a time-on-target interval, wherein at least two CPIs are characterized by waveforms different in at least one parameter;
   b. computer readable program code for causing the computer to perform a coherent integration of said obtained signals, said integration resulting in complex signals corresponding to each of said two or more CPIs;
   c. computer readable program code for causing the computer to interpolate the complex signals in different CPIs;
   d. computer readable program code for causing the computer to perform a coherent integration of the interpolated outputs or derivatives thereof corresponding to said two or more CPIs within the time-on-target integration; and
   e. computer readable program code for causing the computer to enable to provide a target detection decision in accordance with the integration results.

\* \* \* \* \*